March 19, 1968  J. R. STRADER  3,373,581
CONTAINER ARRANGEMENT WITH COOLANT THEREIN
Filed Aug. 31, 1966  2 Sheets-Sheet 1
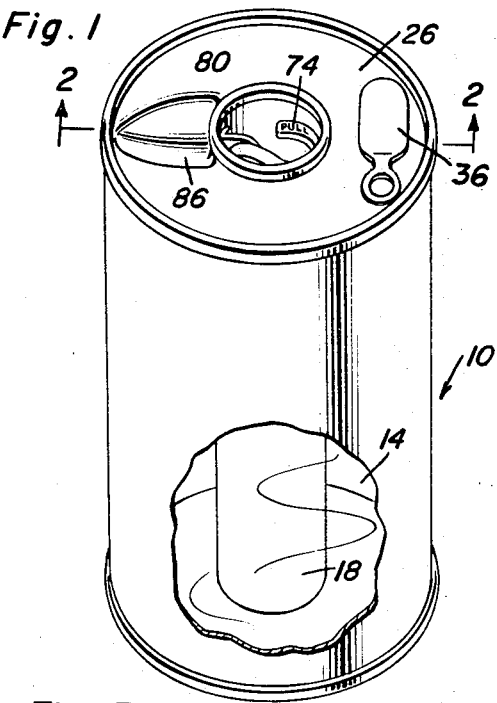
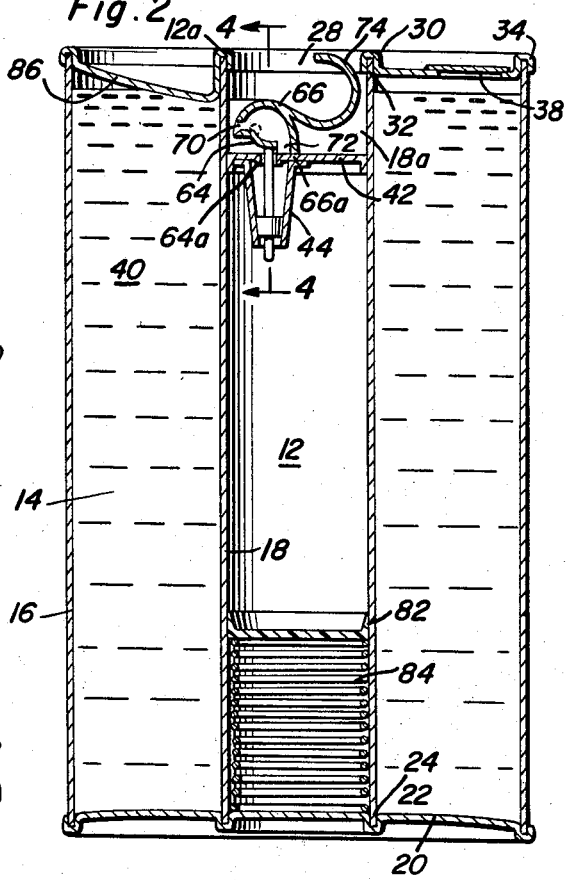
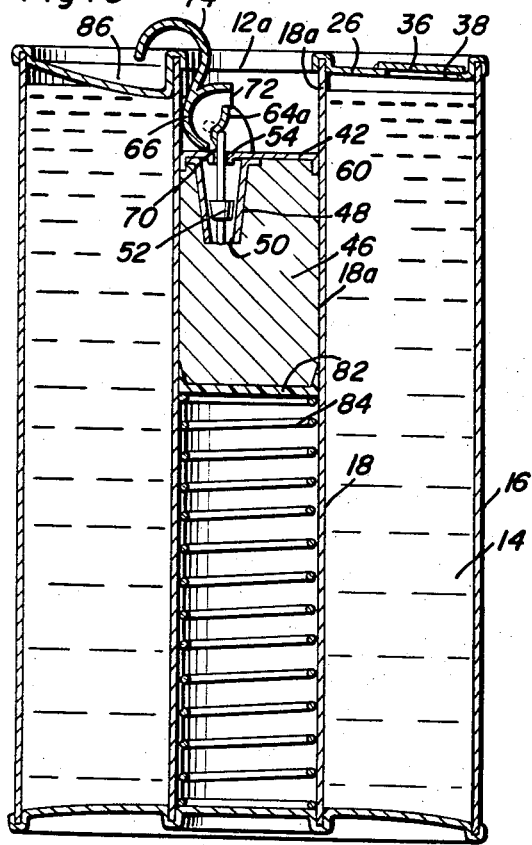
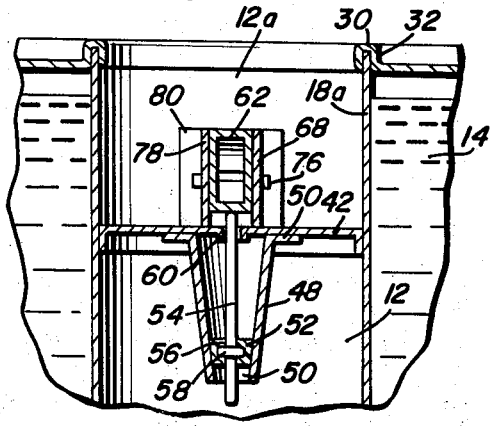
James R. Strader
INVENTOR.

March 19, 1968  J. R. STRADER  3,373,581
CONTAINER ARRANGEMENT WITH COOLANT THEREIN
Filed Aug. 31, 1966
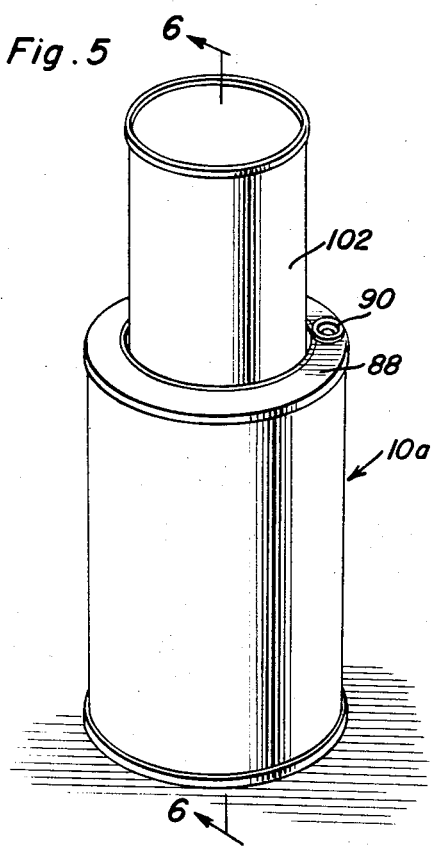
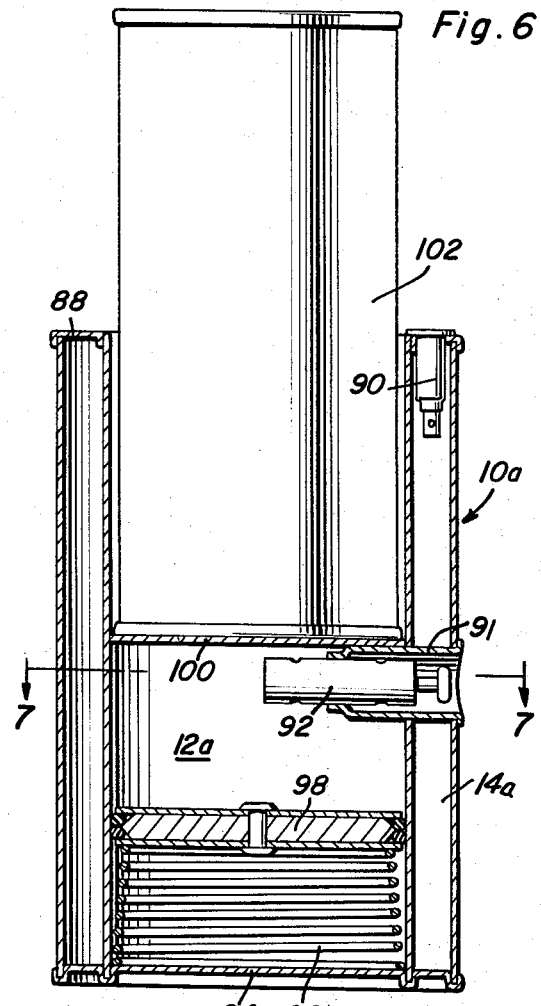
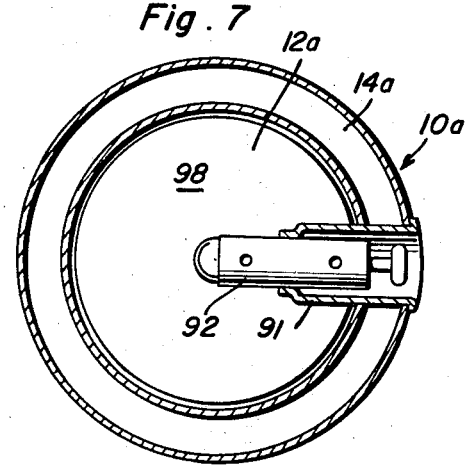
James R. Strader
INVENTOR.

United States Patent Office 3,373,581
Patented Mar. 19, 1968

3,373,581
CONTAINER ARRANGEMENT WITH COOLANT THEREIN
James R. Strader, Fort Wayne, Ind., assignor, by mesne assignments, to John Robert Wray, Jr.
Filed Aug. 31, 1966, Ser. No. 576,390
9 Claims. (Cl. 62—294)

ABSTRACT OF THE DISCLOSURE

A container assembly having a chamber for a consumable beverage and a chamber for a coolant which changes state in response to pressure change for cooling the consumable product. The chambers may be concentrically arranged to form a combined structure or in the form of a separate container for the consumable product.

The present invention generally appertains to improvements in the refrigeration or cooling of liquids, such as consumable beverages, and more particularly relates to novel improvements in a container arrangement having a coolant incorporated therein capable of cooling the contents without exposure to external low temperature conditions.

An important object of the present invention is to provide a portable self-cooling container or portable means, in the nature of a receptacle, for cooling containers for consumable liquids whereby the liquids in the containers can be maintained, for convenient transportation purposes, in an uncooled state and then, at the instant when it is desired to consume the liquid in a cold state, the means is easily and effectively rendered operative for immediate cooling of the liquid.

An important feature of the present invention is to provide a tubular container body having concentrically arranged inner and outer separated and individual annular chambers with one of the chambers containing a liquid to be consumed and the other chamber containing a chemical gaseous mixture which solidifies, almost instantaneously, upon exposure to the atmosphere so as to form a solid cooling block in cooling relation with the other chamber for instantaneously cooling the consumable liquid or beverage in the other chamber.

Another important feature of the present invention is to provide valve means, in structural and functional association with the chamber which contains a chemical gaseous substance, such as carbon dioxide, whereby the chamber can be filled with carbon dioxide and the carbon dioxide can be retained in the chamber in a liquid state until the valve means is actuated, so as to expose the chamber to the atmosphere whereupon the carbon dioxide instantly is converted into a solid block of Dry Ice for cooling the liquid contents in the other chamber.

In line with the foregoing feature, another important feature of the present invention is to provide spring-urged plunger means, in the chamber containing the chemical gaseous substance, such as carbon dioxide, so that when the substance is transformed into a solid cooling block, the spring-urged plunger means is active to move the solid block into the optimum cooling position, with respect to the liquid containing chamber.

Another important object of the present invention is to provide an inexpensive, compact, practical and efficient cooling means for cans and similar containers, particularly of the type used in the packaging of beverages.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a self-cooling container, constructed in accordance with the present invention;

FIGURE 2 is a transverse, vertical sectional view, taken substantially on line 2—2 of FIGURE 1 and showing the valve means in a closed position, with the chemical gaseous substance in liquid state;

FIGURE 3 is a sectional view, similar to FIGURE 2, but showing the valve means in an open position and the chemical substance transformed, by virtue of the opening of the valve means, into a solid block;

FIGURE 4 is a detailed, vertical sectional view, taken substantially on line 4—4 of FIGURE 2 and showing more particularly the structural details of the valve assembly;

FIGURE 5 is a perspective view of a modified form of the present invention;

FIGURE 6 is a vertical sectional view, taken substantially on line 6—6 of FIGURE 5, and, FIGURE 7 is a transverse, cross-sectional view taken substantially on line 7—7 of FIGURE 6.

Referring now more particularly to the drawings and initially to FIGURES 1 through 4, the container 10 is of tubular, cross-sectional construction, structurally simulative to a conventional can for beverages, such as soft drinks or beer. The container is composed of concentrically arranged inner and outer separated and individual annular chambers 12 and 14, respectively. The outer annular chamber 14 is formed by the side wall 16 of the container and by a tubular sleeve 18 coaxially arranged within the side wall 16 and spaced radially inwardly therefrom. The chamber 12 is defined by the interior of the tubular sleeve 18.

The container 10 is formed with a bottom wall 20, which serves as a common bottom wall for the inner chamber 12 and the outer chamber 14. The bottom wall 20 is provided at its center with an annular recessed seat 22, that is formed interiorly of the bottom wall and is adapted to sealingly receive the lower end edge 24 of the sleeve 18.

The outer chamber 14 has an annular top wall 26 which is suitably swagged or rolled at its circumferential edge on the upper edge of the side wall 16, in the same manner that the circumferential edge of the bottom wall 20 is sealingly secured on the lower edge of the side wall 16. The top wall 26 of the outer chamber 14 is formed with a center opening 28 and the bounding edge 30 of the opening is swaged or sealingly rolled onto the upper end edge 32 of the tubular sleeve 18. The top wall 26 is substantially at, below the rim edge 34 and is formed with a conventional pull tab type closure 36, which seals off a dispensing opening 38 for dispensing the liquid contents 40 in the outer chamber 14, the contents being of a consumable nature, such as liquid beverages or the like.

The inner chamber 12 is adapted to contain a suitable chemical gaseous substance, which solidifies upon venting of the top wall 42 for the chamber 12, the top wall 42 being disposed well below the top wall 26 and the portion of the sleeve 18a above the top wall or partition 42 forming a well 12a, which is below the top wall 26 for the outer chamber 14. The chemical gaseous substance may be carbon dioxide which, when a valve means 44, that is operatively carried by the wall 42, is opened, so as to release the pressure and expose the carbon dioxide to the atmosphere, becomes solidified to form a solid block 46, as shown in FIGURE 3.

The valve means 44 includes a frustoconical tubular valve housing 48, that is formed with a laterally extending annular mounting flange 50 on its open upper major end, the flange being suitably fixed to the underside of the wall 42, so that the housing 48 depends therefrom. The lower minor end 50 of the housing is open and the same is closed off by a valve plug 52, which is carried by a valve actuating rod 54. The rod 54 extends through a bore 56 in the valve plug and is anchored therein by virtue of an annular collar 58. The actuating rod or stem 54 sealingly and slidably extends through an opening 60 in the wall 42, which closes off the upper end of the valve housing 48, and is attached at its upper end to a hollow member 62, which is of arcuate configuration and is of rectangular cross-section and defines a dispensing and valve actuating head assembly. The member 62 has a bottom wall 64 and a curved top wall 66, the walls being joined by flat arcuate side walls 68. The top and bottom walls are spaced apart at their adjoining ends to form a slot 70 and are spaced apart at their opposing ends to form a slot 72.

As can be appreciated from a consideration of FIGURES 2 and 3, the rod or stem 54 bears against the underside of the bottom wall 64 at the outer end of its curved portion 64a, with the end edge 66a of the upper curved wall 66 being adapted to bear on the upper surface of the closure wall 42, whereby the valve plug is maintained in a closed position. The wall 64 is formed with a finger-gripping, curved prolongation 74, which is adapted to be gripped so as to move the dispensing and valve actuating head assembly from the closed position of FIGURE 2 to an open position, as shown in FIGURE 3.

In this respect, the member 62 is pivotally mounted at its side walls 68 by pivots 76, which are carried by spaced apart, opposing ears 78, the ears being arcuate and encompassing the side walls 68 and having lateral mounting flanges 80, which are fixed to the inner surface of the sleeve portion 18a, as shown in FIGURE 1.

When the finger-grip member 74 is gripped and the member 62 is swung about the pivots 76 from the closed position of FIGURE 2 to the open position of FIGURE 3, it can be seen that the slot 70 will vent the chamber 18, with the bottom wall 64 having its curved portion 64a moved beyond the stem 54 of the valve, so as to permit the gaseous pressure to lift the valve. The pressure exhausts through the opening 60 in the top wall through the end slot 70 in the member 62 and out through the opening or slot 72 at the other end of the member 62. Instantaneously, the chemical gaseous substance, such as carbon dioxide, becomes a solid block 46.

Means is provided for urging the block to its uppermost position, so that the uppermost portion of the liquid contents in the chamber 14 will be cooled initially and the liquid contents will be constantly cooled, as they pass over the portion of the chamber 12, within which the block 46 is disposed, the block being disposed toward the top wall 26.

The means includes a plunger 82, which is annular and which is formed from resilient material and is of cup-like shape on its upper surface. A spring 84 is coiled between the inner surface of the bottom wall 20 within the sleeve 18 and the undersurface of the plunger 82 which sealingly and slidably engages the inner wall of the sleeve 18 and functions to urge the solid block 46 into a raised position, as shown in FIGURE 3, and to maintain the same in such position.

The top wall 26 is formed with an indentation or depression 86, whereby the finger-grip ring 74 can be pulled from the well by the fingers of a user and moved into the depression 86, so as to open the valve means for the release of the pressure and the consequent transformation of the chemical gaseous substance into the solid block 46.

Thus, the chamber 12 is filled with a chemical, such as carbon dioxide, so that when the valve means is opened, the chemical forms an ice block 46 and the spring-urged plunger 82 automatically functions to move the block 46 to its uppermost position and holds the same therein, such position being the optimum position for cooling the contents of the liquid in the outer chamber 14, as the contents are dispensed through the opening 28. As long as the valve is released, the unit will stay cold until all of the chemical is used up. However, if one desires to only use a part of the ice, this can be done by closing off the valve, whereupon the block will be transformed back into its liquid gaseous state. Such action may be repeated, until all of the chemical substance is exhausted and, then, the valve can be held in an open position and the chamber 12 can be refilled with a replenishing supply of the chemical substance.

To use the can, the valve assembly is quickly and easily opened, by virtue of the ring 74, which pivots the member 62 from the closed position of FIGURE 2 to the open position of FIGURE 3 and allows the valve plug 52 to be shifted upwardly, reacting to the pressure of the chemical substance in the inner chamber 12, so that the pressure is exhausted and the chemical forms a Dry Ice block 46 that is moved to the optimum cooling position by the spring-urged plunger and quickly cools the container and the liquid contents in the outer chamber 14 cooled for dispensing in a cooled state.

With reference to the form, shown in FIGURES 5 and 6, the container 10a is cylindrical and has an outer chamber 14a and an inner chamber 12a. The chambers are arranged in concentric relation and are disposed in separate and individual fashion. The chamber 14a constitutes an annular jacket around the chamber 12a and the chamber 14a is adapted to contain the chemical gaseous substance. The top wall 88 for the outer chamber 14a is formed with an opening to housingly receive a valve assembly 90, which is of the conventional push-pull type and which functions to be pushed down, so as to fill the chamber 14a with the chemical gaseous substance and which is maintained by a spring means (not shown) in a closed upper position. The valve can be moved upwardly, so as to evacuate the pressure and cause the substance in the jacket or chamber 14a to become solid for cooling purposes.

Further, the chamber 12a is adapted to contain the gaseous chemical substance and a radially disposed, inwardly directed tubular housing 91 is formed through the walls and extends into the chamber 12a and supports a valve assembly 92, which is similar to the valve assembly 90 and which functions so as to fill the chamber 12a with the chemical gaseous substance and to exhaust the pressure from the chamber so that the substance becomes a solid.

The container 10a has a bottom wall 94, on which a spring 96 is seated, the upper end of the spring bearing against a plunger 98, which is adapted to urge the block upwardly into contact with the partition wall 100 in the inner chamber 12a. The partition wall 100 forms a seat for a conventional can 102, which is seated within the jacket 14a on the upper surface of the partition wall 100.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A container arrangement for enabling heat exchange of a product comprising a tubular container assembly having separated and individual chambers therein, at least one of said chambers having a product therein, at least another of said chambers having a heat exchange medium therein, said chambers being in heat exchange relation, said heat exchange medium being subject to temperature change in response to change in pressure, valve means in said heat exchange medium chamber to enable change in pressure therein thereby resulting in a temperature change, and means in said heat exchange medium chamber urging the heat exchange medium to an optimum heat exchange relation with the product chamber.

2. The container arrangement as defined in claim 1 wherein said chambers are arranged in concentric relation with the outer chamber containing the product, said chambers being coextensive in length with the outer chamber having an openable top portion through which the product is discharged, said means urging the heat exchange medium toward the end of the arrangement having the openable top portion for subjecting the product to the heat exchange medium just before discharge.

3. A cooling container arrangement for liquids, such as beverages, comprising a tubular container body having concentrically arranged inner and outer separated and individual annular chambers, said chambers having opposing closed ends, one of said chambers adapted to contain a beverage to be consumed and the other chamber adapted to contain a chemical gaseous substance which solidifies upon exposure to the atmosphere so as to form a solid cooling member, means associated with the other of the chambers for filling it with a chemical gaseous substance and a valve means associated with the filling means for closing off the other chamber and for venting the said chamber to the atmosphere so as to release the pressure and transform the gaseous substance into the solid cooling member, and means provided within the other of said chambers for moving the solid cooling member into the optimum cooling position with respect to the one of said chambers.

4. The invention of claim 3, wherein said last means comprises a spring-urged plunger.

5. The invention of claim 4, wherein said spring-urged plunger is slidably disposed in the other of said chambers and sealingly arranged therein and is movable in a direction along the longitudinal axis of said chamber.

6. The container arrangement as defined in claim 1 wherein said product chamber is an independent container, said heat exchange chamber having a recess therein removably receiving at least part of the product container, said heat exchange medium chamber including a wall defining the inner end of said recess for engagement with the product container, said means urging said heat exchange medium toward said wall.

7. A cooling container arrangement for liquids, such as beverages, comprising a tubular container body having concentrically arranged inner and outer separated and individual annular chambers, said chambers having opposing closed ends, one of said chambers adapted to contain a beverage to be consumed and the other chamber adapted to contain a chemical gaseous substance which solidifies upon exposure to the atmosphere so as to form a solid cooling member, means associated with the other of the chambers for filling it with a chemical gaseous substance and a valve means associated with the filling means for closing off the other chamber and for venting the said chamber to the atmosphere so as to release the pressure and transform the gaseous substance into the solid cooling member, said valve means including a valve assembly for filling the other chamber with a chemical gaseous substance when in an open position and for retaining the substance in liquid form when in a closed position and for releasing the pressure and venting the substance to the atmosphere, when in an open position, so as to transform the substance into the solid cooling member, and means provided in said other chamber for moving said solid cooling member axially of the chamber.

8. The invention of claim 7, wherein said last means includes a spring-urged plunger.

9. In a cooling container arrangement for liquids, a chamber adapted to contain a chemical gaseous substance which solidifies upon exposure of the chamber to the atmosphere, valve means associated with said chamber for releasing the pressure of and venting the substance to the atmosphere so that it is transformed into a solid cooling member and spring-urged plunger means operatively disposed in said chamber for moving said solid cooling member axially of the chamber.

References Cited

UNITED STATES PATENTS

| 2,460,765 | 2/1940 | Palaith | 62—294 |
| 2,746,264 | 5/1956 | Keyes | 62—293 |
| 2,898,747 | 8/1959 | Wales | 62—294 |
| 3,229,478 | 1/1966 | Alonso | 62—371 |
| 3,257,821 | 6/1966 | Warner | 62—457 |
| 3,309,890 | 3/1967 | Barnett | 62—294 |

WILLIAM J. WYE, *Primary Examiner.*